United States Patent [19]

Nagano

[11] Patent Number: 5,375,299
[45] Date of Patent: Dec. 27, 1994

[54] CLAMPING DEVICE

[75] Inventor: Kenji Nagano, Ibaragi, Japan

[73] Assignee: Kabushiki Kaisha Kenlock, Ibaragi, Japan

[21] Appl. No.: 91,902

[22] Filed: Jul. 15, 1993

[30] Foreign Application Priority Data

Mar. 31, 1993 [JP] Japan ................ 5-021620[U]

[51] Int. Cl.$^5$ ................ F16L 33/04
[52] U.S. Cl. ................ 24/20 R; 24/20 TT
[58] Field of Search ........... 24/20 R, 20 CW, 20 EE, 24/20 TT, 20 W

[56] References Cited

U.S. PATENT DOCUMENTS

| | | |
|---|---|---|
| 3,082,498 | 3/1963 | Oetiker . |
| 3,286,314 | 11/1966 | Oetiker . |
| 3,402,436 | 9/1968 | Oetiker . |
| 3,789,463 | 2/1974 | Oetiker . |
| 4,299,012 | 11/1981 | Oetiker . |
| 4,315,348 | 2/1982 | Oetiker . |
| 4,492,004 | 1/1985 | Oetiker ............ 24/20 TT X |
| 5,103,535 | 4/1992 | Ishijima ............ 24/20 R |
| 5,191,684 | 3/1993 | Kenwright ............ 24/20 R |
| 5,283,931 | 2/1994 | Oetiker ............ 24/20 R |
| 5,307,541 | 5/1994 | Nagano ............ 24/20 EE X |

Primary Examiner—James R. Brittain
Attorney, Agent, or Firm—Nikaido, Marmelstein, Murray & Oram

[57] ABSTRACT

The present invention relates to a clamping device for semipermanently fixing a part, such as a fluid conveying hose, dustproof bellows, axial boot or the like, on the circumferential surface of an desired mating device. According to this invention, even if such part looses its elasticity owing to aging, the clamping device maintains the permanent stable firm clamping state. For this purpose, the inner and outer overlap portions (11a, 11b) of the clamp band (11) are forced by an operating tool to spread until the seizing tooth (18a) of the inner overlap portion (11a) and the fixed tooth (22b) of the outer overlap portion (11b) seize each other, thereby contracting the bore diameter of the clamp band (11). This state is locked by a prop key (23) extending from the outer overlap portion (11b) to engage the inner overlap portion (11a), while an elastic hump (25) for storing the spring force acting circumferentially of the clamp band (11) is outwardly bulged from the outer overlap portion (11b).

3 Claims, 22 Drawing Sheets

CLAMPING DEVICE

BACKGROUND OF THE INVENTION

The present invention relates to improvements in a clamping device used for semipermanently fixing a fluid conveying hose, dustproof bellows, axial boot or the like made of a plastic material, such as rubber or synthetic resin, to the connecting circumferential surface of a desired mating device.

The so-called open type clamping device is known wherein a clamp band of metal strip material cut to a fixed length is wound into a circular ring with one end overlapping the other, whereby said clamp band is three-dimensionalized, the bore diameter being then artificially forcibly contractively deformed and the opposite ends locked together, a rubber hose for conveying various fluids is connected to the cylindrical mouthpiece portion of a joint pipe, cock or the like. Lobe-formed clamping devices called Oetiker are well known in the art. In this clamping device, as suggested from U.S. Pat. Nos. 3,082,498; 3,286,314; 3,402,436; 3,789,463; 4,299,012; and 4,315,348, the circumferential surface of the clamp band is formed with one or two bridge type lobes integrally projecting therefrom, the arrangement being such that the lobes are squeezed and crushed by an exclusive tool to reduce the bore diameter.

In that case, although the clamp band does not develop springiness to expand or contract in circumferential direction, since said rubber hose to be fixed is usually made of a rubber material having a relatively low hardness (elasticity) with a Shore hardness of about 60 or less, the clamp band closely contacts the rubber hose throughout the circumferential surface thereof; thus, the rubber hose or the like can be held on a desired mating device in a stable tightened state without any danger of deviation or slipping off.

However, parts to be fixed, such as dustproof bellows and axial boots which are blow-molded from thermoplastic synthetic resin material have a high hardness, such as a Shore hardness of 90 or more, lacking in elasticity itself. Thus, such part can hardly be stably and firmly tightened on the connecting circumferential surface of a desired mating device. Particularly, when it is used for a vehicle which is subjected to torques, vibrations and shocks, there is a danger of causing deviation and slipping off.

Even if the clamp band of said lobe-formed clamping device is further formed with a number of locking teeth and receiving holes besides said lobes to allow the bore diameter of the expandable clamp band to be adjustable, since the lobes are squeezed by a tool in the final stage subsequent to the engagement between the locking teeth and the receiving holes, there will be excess or deficiency of the bore diameter reducing force unless the amount of squeeze is properly determined to suit the thickness of the part to be fixed; thus, a stable firm tightened state cannot be maintained. Further, if the squeezing force and crushing force on said lobes are cancelled, the lobes will spring back in the direction to open, thus aggravating the above problem.

Further, such problem occurs not only in said parts made of synthetic resin with high hardness but also in parts made of rubber having elasticity. In the latter case, if the elasticity is lost owing to aging with the lapse of time, a similar problem occurs, making it impossible to maintain the service durability in the tightened state.

Further, in the lobe-formed clamping device, since it is used with the lobes crushed, there is a merit that the lobes do not rise high above the circumferential surface of the camp band. On the other hand, there is a demerit that the weight distribution is extremely localized, so that if the clamping band is used for an apparatus which rotates at high speed, the clamping force provided by the clamping band does not uniformly act on the circumferential surface of the part, with local weakness in the clamping force being produced.

SUMMARY OF THE INVENTION

The present invention has been accomplished to solve such problems, and a first object is to provide an arrangement wherein a clamp band is made of a stainless steel or other metal strip material wound in circular ring form for three-dimensionalization, the outer overlap portion being formed with an elastic hump outwardly bulged in the form of an angle, arch or other bend as seen in front view, said elastic hump serving to store the spring force acting circumferentially of the clamp band, so that even if a part to be fixed is a dustproof bellows, axial boot or the like made of highly rigid synthetic resin with no elasticity or even if a part to be fixed such as a fluid conveying hose made of elastic rubber material looses its elasticity owing to aging, the clamping device fixedly maintains such part in permanent, reliable close contact with the connecting circumferential surface of a desirable mating device in a stable tightened state.

A second object is to provide an arrangement wherein the lower surface of the opening defined by the elastic hump formed by outwardly bulging the outer overlap portion of the clamp band is closed by the inner overlap portion of the clamp band, while a narrow nose extending from one cut end of said inner overlap portion is received for relief in a nose receiving hole formed in the outer overlap portion, thereby preventing level differences or clearances from being formed on the clamping surface of the clamp band, thereby ensuring that the clamping force acts uniformly throughout the circumferential surface of the part to be clamped, with no local weakness in the clamping force produced.

A third object is to provide an arrangement wherein a second convex channel wall outwardly bulged from the inner overlap portion of the clamp band, while a concave channel wall is reversely or inwardly bulged from the outer overlap portion, and a seizing tooth forming part of said second convex channel wall and a fixed tooth forming part of the middle of the concave channel wall seize each other in the overlap plane of said inner and outer overlap portions, thereby achieving the flattening of the clamp band and preventing the warping-up in the direction to cause disengagement between the seizing tooth and the fixed tooth, thereby increasing the service durability to withstand torques, vibrations and shocks. The fact that said second convex channel wall and concave channel wall are bulged by an amount approximately equal to only the thickness of the metal strip material contributes to the prevention of unnecessary bulking of said clamp band.

A fourth object of the invention is to provide an arrangement wherein the inner overlap portion is formed with a prop key receiving opening, while the outer overlap portion is formed with a prop key bent and projecting therefrom, so that as soon as there occurs an accidental disengaging force acting between the fixed tooth and the seizing tooth, the prop key engages the opening edge of the prop key receiving hole, whereby even if the clamp band is subjected to high speed rotation, violent vibrations, shocks or the like, it is prevented from deviating or slipping off the part to be fixed. And such torques, vibrations, shocks and the like are effectively absorbed by said elastic hump.

A fifth object is to provide an arrangement wherein one cut end of the inner overlap portion of the clam band is formed with a locking pin receiving hole adapted to engage a locking pin on a roll-bending mandrel roll and an intermediate portion where said inner and outer overlap portions do not overlap each other is formed with first through third roll-bending relief openings at positions selected with the amount of spring back allowed for, so that the clamp band can be easily wound by the rotation of said mandrel roll to form a circular ring for three-dimensionalization with a stabilized bore diameter.

To achieve the above objects, the present invention provides a clamping device including a clamp band of metal strip material cut to a fixed length, said clamp band being wound in a circular ring for three-dimensionalization such that an inner overlap portion terminating in one roll-bent end and an outer overlap portion terminating in the other end overlap each other by a fixed amount, the bore diameter of said clamp band being artificially forcibly contracted, thereby fixing a part to be fixed, such as a fluid conveying hose, dust-proof bellows, axial boot or the like made of plastic material, such as rubber or synthetic resin, on the connecting circumferential surface of a desired mating device, said clamping device being characterized in that:

one cut end of the inner overlap portion alone is notched to form a nose of fixed width smaller than the fixed width of the metal strip material, the inner overlap portion is formed with an operating tool receiving hole, a prop key receiving hole and a fixed tooth receiving hole, distributed in the order mentioned from the nose toward an intermediate portion where the clamp band does not overlap, the opening edge of said operating tool receiving hole on the side adjacent the nose is outwardly bulged to form a first convex channel wall for operating tool reception, the opening edge of said fixed tooth receiving hole on the side adjacent the prop key receiving hole is outwardly bulged to form a second convex channel wall, and a portion of the middle of said second convex channel wall forms a seizing tooth bulged toward said fixed tooth receiving hole, the outer overlap portion is formed with a hole for receiving the second convex channel wall, an operating tool receiving communication hole which communicates with said operating tool receiving hole, and a hole for receiving the nose, distributed in the order mentioned from the other cut end toward the intermediate region where the clamp band does not overlap, the opening edge of said second convex channel wall receiving hole adjacent the other cut end is oppositely or inwardly bulged to form a concave channel wall opposed to said second convex channel wall, a portion of the middle of said concave channel wall being bulged inwardly toward said second convex channel wall receiving hole to form a fixed tooth adapted to be seized by said seizing tooth, the opening edge of the second convex channel wall receiving hole on the side adjacent said operating tool receiving communication hole is bent to form a prop key adapted to be received in the prop key receiving hole through the second convex channel wall receiving hole, the opening edge of the operating tool on the side adjacent the second convex channel wall receiving hole is outwardly bulged to form a third convex channel wall opposed to said first convex channel wall for supporting the operating tool, the clamp band is formed with an elastic hump outwardly bulged between said operating tool receiving communication hole and said nose receiving hole for storing the spring force acting circumferentially of the clamp band, the arrangement being such that the active teeth of a spread type operating tool are respectively engaged with the first convex channel wall of the operating tool receiving hole in said inner overlap portion and the third convex channel wall of the operating tool receiving communication hole in said outer overlap portion and the operating tool is manipulated to spread its pair of active teeth to forcibly deform the bore diameter of said clamp band, whereupon the seizing tooth of the inner overlap portion and the fixed tooth of the outer overlap portion seize each other, and as soon as a force acts to cause disengagement between the fixed tooth and the seizing tooth, the prop key of the outer overlap portion engages the opening edge of the prop key receiving hole in the inner overlap portion.

According to the above arrangement of the present invention, the clamp band serving as the so-called open type clamping device can be conveniently applied to various fluid conveying hoses, dustproof bellows, axial boots and other parts to be fixed, in the axial direction to effect temporary attachment.

In the wrapped state, since the inner and outer overlap portions of the clamp band overlap each other, the active teeth of the spread type operating tool can be respectively engaged with the third convex channel wall of the operating tool receiving communication hole in the outer overlap portion and the first convex channel wall of the inner overlap portion and then the operating tool is manipulated to move the first and third convex channel walls away from each other so as to forcibly contract the bore diameter of the clamp band.

Then the nose forming one cut end of the inner overlap portion moves into the nose receiving hole, while the fixed tooth forming a portion of the middle of the concave channel wall of the outer overlap portion and the seizing tooth forming a portion of the middle of the second convex channel wall of the inner overlap portion are moved across each other until they seize each other; therefore, said part to be fixed can be semipermanently fixed tightly on the connecting circumferential surface of the mating device.

Particularly, since the elastic hump is outwardly bulged from the outer overlap portion and stores the spring force acting circumferentially of the clamp band, even if a part to be fixed is made of highly rigid synthetic resin with no elasticity or even if a part to be fixed such as a fluid conveying hose made of elastic rubber material looses its elasticity owing to aging, the tension spring force in the elastic hump maintains the clamping surface of the clamp band in permanent, stable close contact with the entire connecting circumferential surface of the part to be fixed, said hump effectively absorbing torques, vibrations, shocks and the like occurring during use.

The hump is disposed in a position where the outer and inner overlap portions overlap each other by a fixed amount, said hump is outwardly bulged from the outer overlap portion and its opening lower surface is closed by the inner overlap portion. Therefore, coupled with the fact that the nose of the inner overlap portion is received in the nose receiving hole of the outer overlap portion, the clamping surface of the clamp band can be closely contacted with the entire clamping surface of the clamp band without forming clearances or level differences thereon, so that there is no danger of producing local weakness from the standpoint of clamping action. Further, since said fixed teeth and said seizing tooth are adapted to seize each other on the overlapping plane of the inner and outer overlap portions, the clamp band is kept extremely flat and the warping-up in the direction to cause disengagement between the fixed tooth and the seizing tooth is effectively prevented.

Further, the prop key extending from the outer overlap portion of the clamp band is received in the prop key receiving hole in the inner overlap portion through the second convex channel wall receiving hole; thus, if the disengaging force should act between the fixed tooth and the seizing tooth, the prop key instantly engages the opening edge of the prop key receiving hole. Therefore, there is no danger of said tightened state being loosened or separation and the clamping device is superior in service durability to withstand high speed torques, violent vibrations, shocks and the like.

DESCRIPTION OF THE PREFERRED EMBODIMENTS

Figure 1:
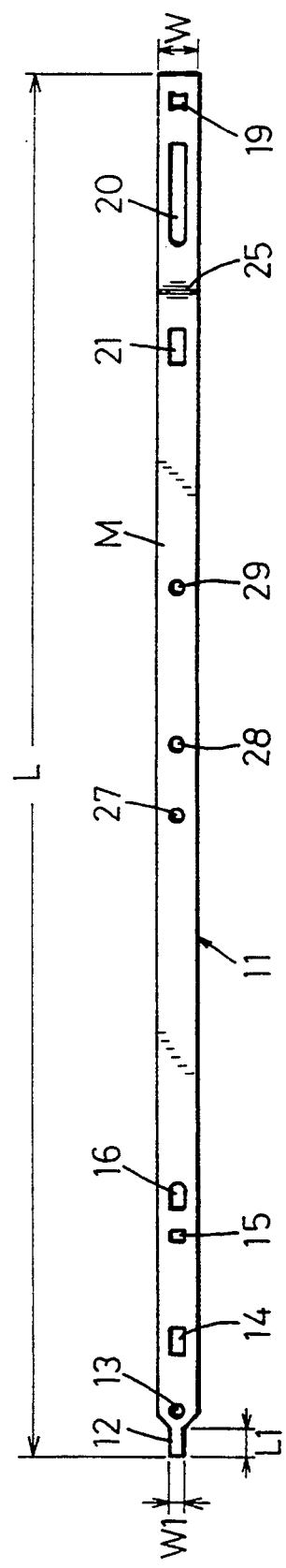
FIG. 1 is a plan view showing the developed planar state of a clamping device according to the present invention.
Figure 2:
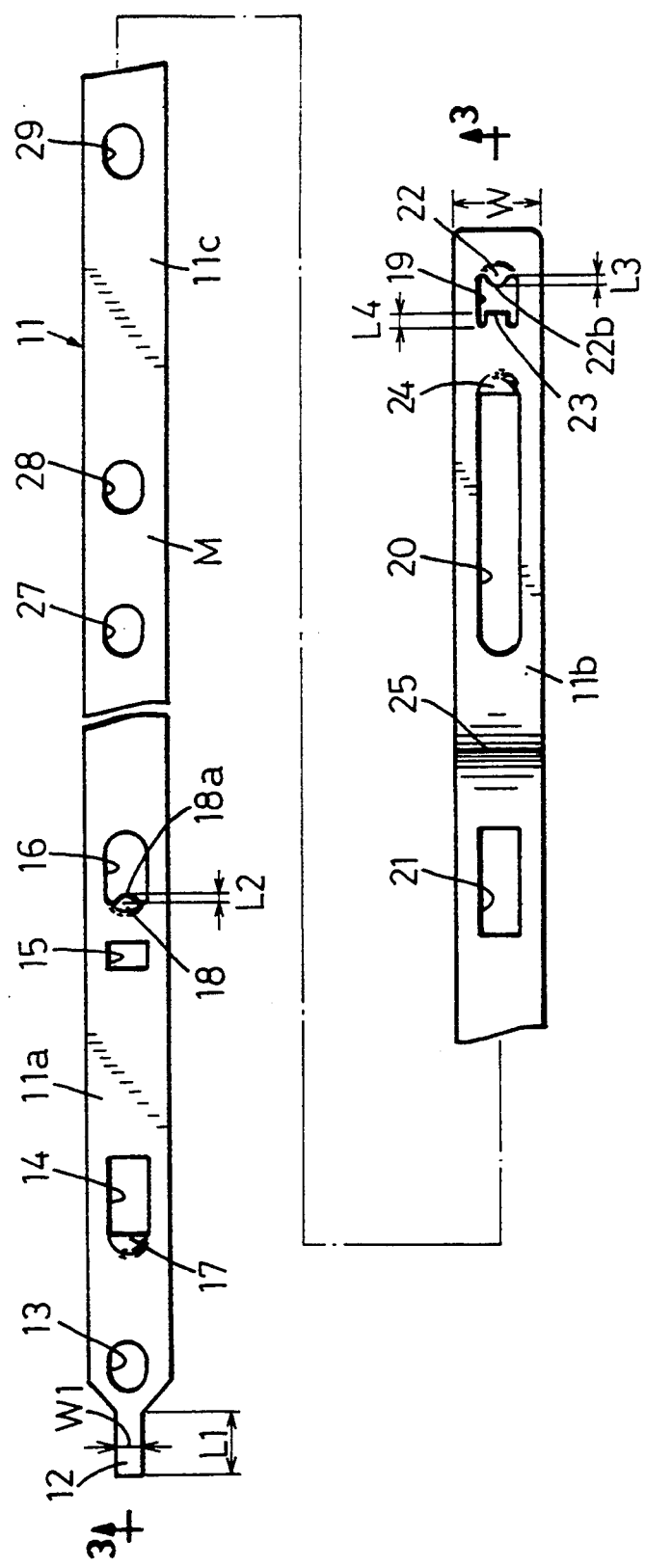
FIG. 2 is an enlarged plan view with part of FIG. 1 cut away.
Figure 3:
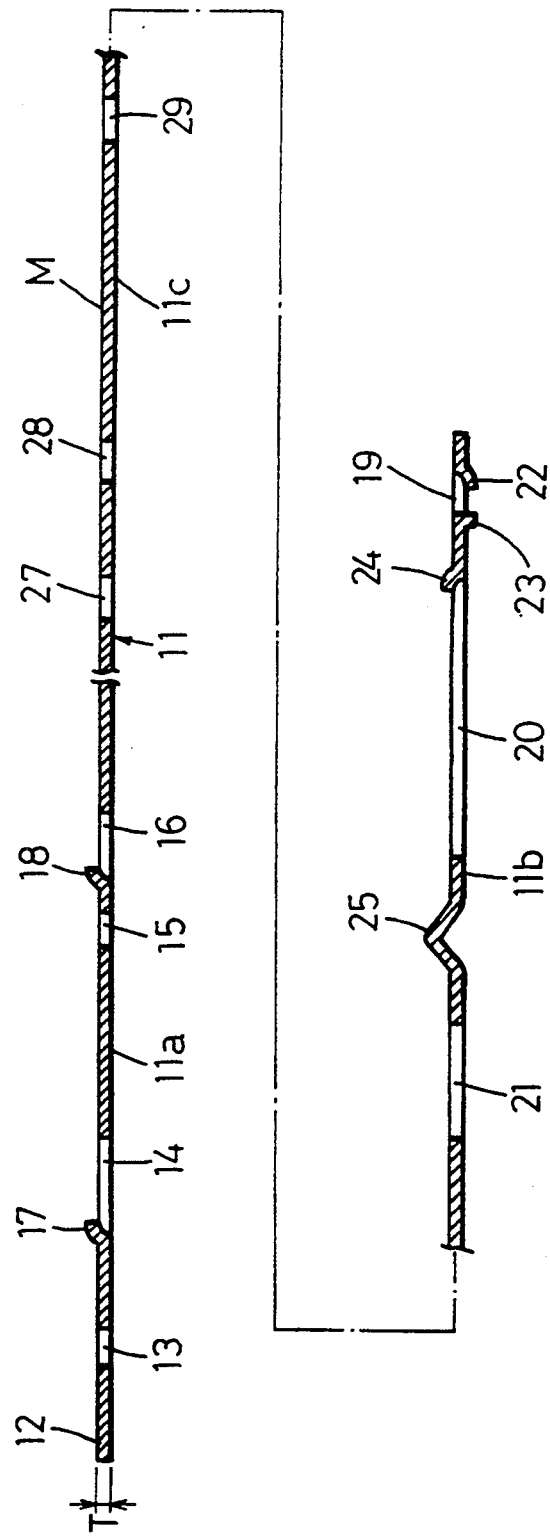
FIG. 3 is a sectional view taken along the line 3—3 in FIG. 2.

The concrete arrangement of the present invention will now be described in detail with reference to a preferred embodiment of the invention shown in the drawings. FIGS. 1 through 3 show the developed planar state (the material processing state) of a clamping device according to the invention, and FIGS. 4 through 9 show a roll-bent three-dimensionalized product and its state of use. As a material for the clamping device, use is made of stainless steel (for example, SUS 301 or SUS304) having a fixed thickness T (e.g., about 0.7–1.0 mm). a fixed width W (e.g., about 7–10 mm) or the like metal strip M, such long-sized material being cut into lengths having a fixed length L suited to the diameter of a part to be fixed 10, such as a dustproof bellows, axial boot or the like.

The numeral 11 denotes a clamp band made of such metal strip material M cut to a fixed length roll-bent for three-dimensionalization in a circular ring as seen in front view, said clamp band being used to clamp the part 10. Roll-bent one end side overlaps the other end side of the clamp band by a fixed amount X. That is, they are in the overlap state in which one roll-bent end of the clamp band 11 forms an inner overlap portion 11a and the other roll-bent end forms an outer overlap portion 11b. The character 11c denotes an intermediate portion where no overlap takes place.

The clamp band 11 has, of course, the fixed width of the metal strip material M, but one cut end alone of the inner overlap portion 11a is cut to form a nose 12 having a fixed width W1 (e.g., about 2.5–3.0 mm) narrower than the fixed length W of the metal strip material M. The character L1 indicates the length of the nose 12. For example, it is about 7–10 mm.

The numerals 13, 14, 15, and 16 denote a roll-bending formation pin receiving hole, an operating tool receiving hole, a prop key receiving hole and a fixed tooth receiving hole disposed in the order mentioned in the inner overlap portion 11 as viewed from the nose 12 toward the intermediate portion 11c, all these being disposed on the longitudinal centerline of the metal strip material M.

The roll-bending formation pin receiving hole 13 is oval as seen in plan view, adapted to receive a locking pin erected on the circumferential surface of the forming mandrel roll to be later described and with the locking pin received to establish the locked state, the clamp band 11 is roll-bent in a circular ring form for three-dimensionalization by the rotation of the mandrel roll.

Further, the operating tool receiving hole 14 is punched out in rectangular form as seen in plan view, adapted to receive an operating tool to be later described, and its opening edge adjacent the formation pin receiving hole 13 is formed with a first convex channel wall 17 upwardly bulged by an amount approximately equal to the thickness T of the metal strip material M by bending up the strip material M.

The first convex channel wall 17 functions as an operating tool support reinforcing bead or rib to resist the spreading force developed by the operating tool; thus, the operating tool can be reliably stably supported.

The prop key receiving hole 15 is a quadrangle as seen in plan view shorter than the operating tool receiving hole 14, and its opening edge adjacent the fixed tooth receiving hole 16 is engageable with the prop key of the outer overlap portion 11b to be later described.

Further, the fixed tooth receiving hole 16 is disposed adjacent the prop key receiving hole 15, and its opening edge on the side adjacent the prop key receiving hole 15 is formed with a second convex channel wall 18 outwardly bulged by an amount approximately equal to the thickness T of the metal strip material M by bending up the strip material M.

Further, a portion of the middle of the second channel wall 18 extends by a fixed amount L2 (e.g., about 1.5 mm) toward the fixed tooth receiving hole 18 to form a seizing tooth 18a adapted to engage the fixed tooth of the outer overlap portion 11b to be later described. In addition, the opening edge of the fixed tooth receiving hole 16 opposed to the second convex channel wall 18 forms a concavely curved surface, as shown in FIG. 2.

On the other hand, the outer overlap portion 11b of the clamp band 11 is formed with a second convex channel wall receiving hole 19, an operating tool receiving communication hole 20 and a nose receiving hole 21 disposed in the order mentioned from the other cut end toward the intermediate portion 11c.

The opening edge of the second convex channel wall receiving hole 19 on the other cut end is inwardly recessed by an amount approximately equal to the thickness T of the metal strip material M to form a concave channel wall 22 by bending up the strip material M in the opposite direction in the roll-bent three-dimensional state of the clamp band as shown in FIGS. 5 through 8, said concave channel wall 22 being opposed to the second convex channel wall 18 of the inner overlap portion 11a.

Whereas the first and second convex channel walls 17 and 18 of the inner overlap portion 11a are outwardly bulged, the concave channel wall 22 of the outer overlap portion 11b is inwardly bulged. Further, a portion of the middle of the concave channel wall 22 extends by a fixed amount L3 (e.g., about 1.5 mm) to form a fixed tooth 22b directed to the second convex channel wall 19 receiving hole 19, said fixed tooth 22b being engageable with the seizing tooth 18a of the inner overlap portion 11a.

In that case, the concave channel wall 22 is inwardly bulged from the outer overlap portion 11b by an amount approximately equal to the thickness T of the metal strip material M and the second convex channel wall 18 is outwardly bulged from the inner overlap portion 11a by an amount approximately equal to the thickness T of the metal strip material M; therefore, the fixed tooth 22b and the seizing tooth 18a seize each other in the overlap plane of the inner and outer overlap portions 11a and 11b.

The opening edge of the second concave channel wall receiving hole 19 on the side adjacent the operating tool receiving communication hole 20 extends by a fixed amount L4 and is bent to form a prop key 23 directed to the second convex channel wall receiving hole 19, so that as soon as there occurs an accidental disengaging force acting between the fixed tooth 22b and the seizing tooth 18a, the prop key 23 is received in the prop key receiving hole 15 to engage the opening edge thereof, propping the second convex channel wall 18 from behind, thereby holding the fixed tooth 22b and the seizing tooth 18a in the locked state, preventing them from being disengaged.

Figure 9:
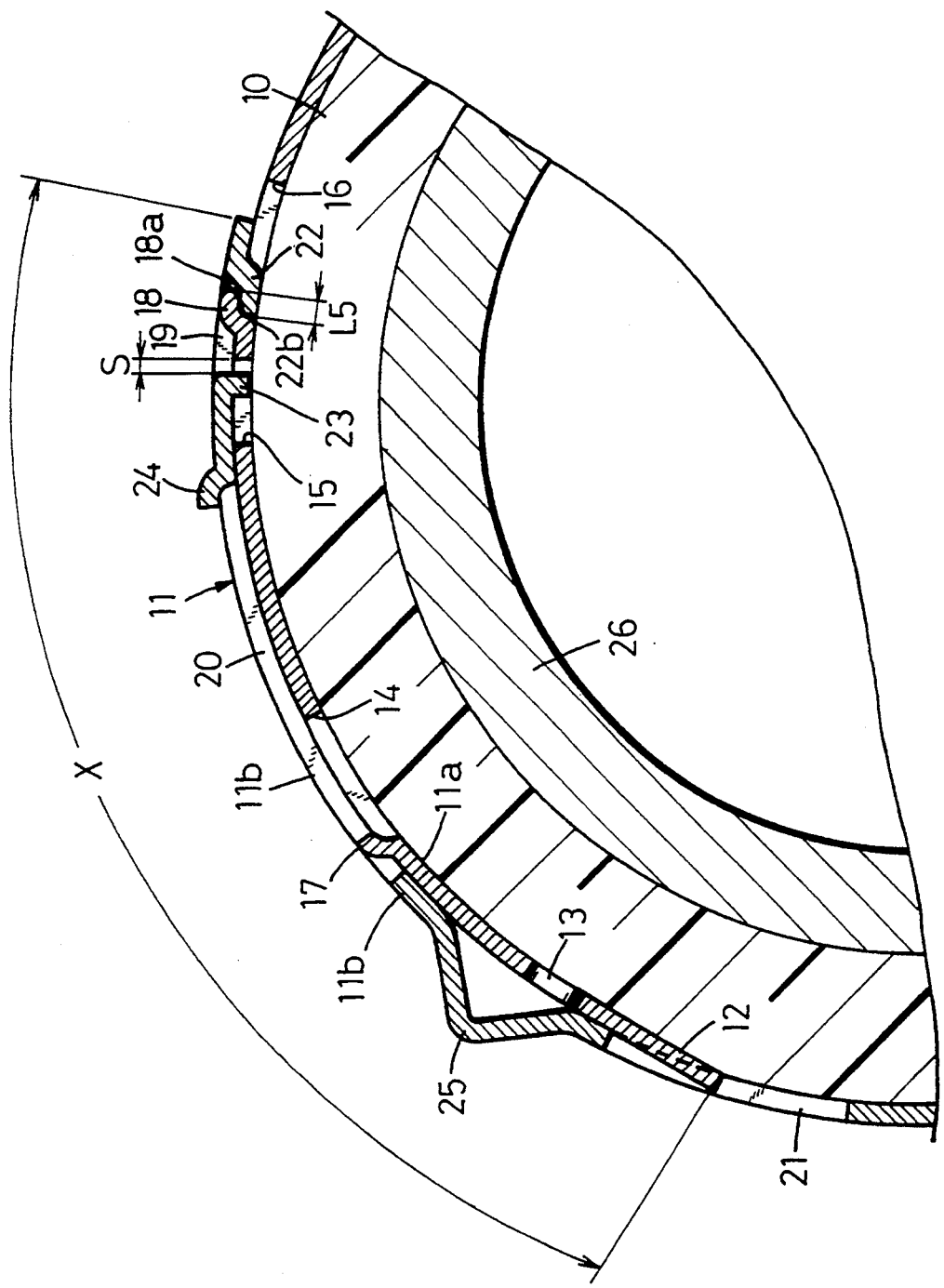
FIG. 9 is an enlarged sectional view showing a portion of FIG. 7.

That is, when the fixed tooth 22b and the seizing tooth 18a are in seizure engagement, as is clear from FIG. 9, a fixed amount of clearance S is defined between the front end of the prop key 23 and the opening edge of the prop key receiving hole 15. When the prop key 23 is engaged with the opening edge of the prop key receiving hole 15, the fixed tooth 22b and the seizing tooth 18a still engage each other though slightly. This means that the amount of seizure engagement L5 is slightly greater than said clearance S.

The operating tool receiving communication hole 20 of the outer overlap portion 11b is elongated, sufficiently longer than the operating tool receiving hole 14 of the inner overlap portion 11a to communicate with the operating tool receiving hole 14 in the roll-bent three-dimensionalized state.

Furthermore, the opening edge of the operating tool receiving communication hole 20 on the side adjacent the second convex channel wall receiving hole 19 is outwardly bulged by an amount approximately equal to the thickness T of the strip material M to form a third convex channel wall 24 by bending up the metal strip material M.

The third convex channel wall 24 is in the opposed relation to the first convex channel wall 17 of the inner overlap portion 11a and adapted to be reliably and stably engaged by the operating tool while serving as an operating tool support reinforcing bead or rib to resist the spreading force produced by the operating tool. In addition, the opening edge of the operating tool receiving communication hole 20 on the side adjacent the nose receiving hole 21 is a concavely curved surface, as shown in FIG. 2. The nose receiving hole 21 is rectangular as seen in plan view and serves to receive the nose 12 which is disposed at one cut end of the inner overlap portion 11a, thereby preventing level differences from being formed on the clamping surface of the clamp band 11.

The numeral 25 denotes an elastic hump interposed between the operating tool receiving communication hole 20 and the nose receiving hole 21, said elastic hump being outwardly bulged in the form of an angle, arch or other bend as seen in front view. In the roll-bent three-dimensional state of the clamp band 11, the lower surface of the opening defined by said elastic hump is closed by the inner overlap portion 11a. That is, the elastic hump 25 is positioned in the overlap region of fixed size X in the outer overlap portion 11b and is outwardly bulged, thereby storing the spring force acting circumferentially of the clamp band 11.

Therefore, even if the part to be fixed 10 is a dust-proof bellows, axial boot or the like made of synthetic resin material have a relatively high hardness, such as a Shore hardness of 90 or more, lacking in elasticity, or even if the part to be fixed 10 is a fluid conveying hose made of rubber material having elasticity with a Shore hardness of 60 or less loses its elasticity with the lapse of time, the elastic hump 25 of the clamp band 11 elastically deforms to exert its tension spring force to keep firmly contacting the circumferential surface of the part 10, thus maintaining the part 10 stably reliably tightened on the connecting circumferential surface of a desired mating device 26. Besides this, the elastic hump 25 is capable of effectively absorbing vibrations and shocks produced in the part 10 during use.

In this respect, as considered from the function of storing the spring force acting circumferentially of the clamp band 11, it could be contemplated to outwardly bulge the elastic hump from the intermediate portion 11c where the clamp band does not overlap. With such arrangement, however, the opening lower surface of the elastic hump 25 would not be closed, so that the clamping surface of the clamp band 11 would not intimately contact the circumferential surface of the part 10, with a clearance formed therebetween, resulting in an insufficient tightening effect. For this reason, in the present invention, the elastic hump 25 is bulged from the outer overlap portion 11b of the clamp band 11.

Further, in the illustrated embodiment, a single elastic hump 25 is bent up in angle form as said tension spring component. However, so long as said function can be performed, a plurality of such angle-shaped humps may be continuously formed by bulging in wave or zigzag form. However, the omega type in which the opening lower surface of the bent shape is narrower than the innermost region is not desirable. The reason is that during the roll-bending formation using a mandrel roll to be later described, the nose 12 of the inner overlap portion 11a tends to enter the opening lower surface of the elastic hump 25, interfering with smooth roll-bending operation. Thus, the angle type and arch type in which the opening lower surface is wider than the innermost region are preferable. In addition, the plate surface of each elastic hump 25 may be stamped to form a reinforcing bead or rib.

The numerals 27, 28 and 29 denote first through third relief holes for roll-bending operation formed in the intermediate portion 11c between the outer and inner overlap portions 11b and 11a of the clamp band 11, said relief holes being oval in plan view and disposed on the longitudinal centerline of the metal strip material M.

These first through third relief holes will be used when said clamp band 11 is roll-bent for three-dimensionalization, as will be later described in more detail.

Such clamping device of the present invention can be mass-produced from stainless steel or other metal strip material M in the following manner.

Figure 10:
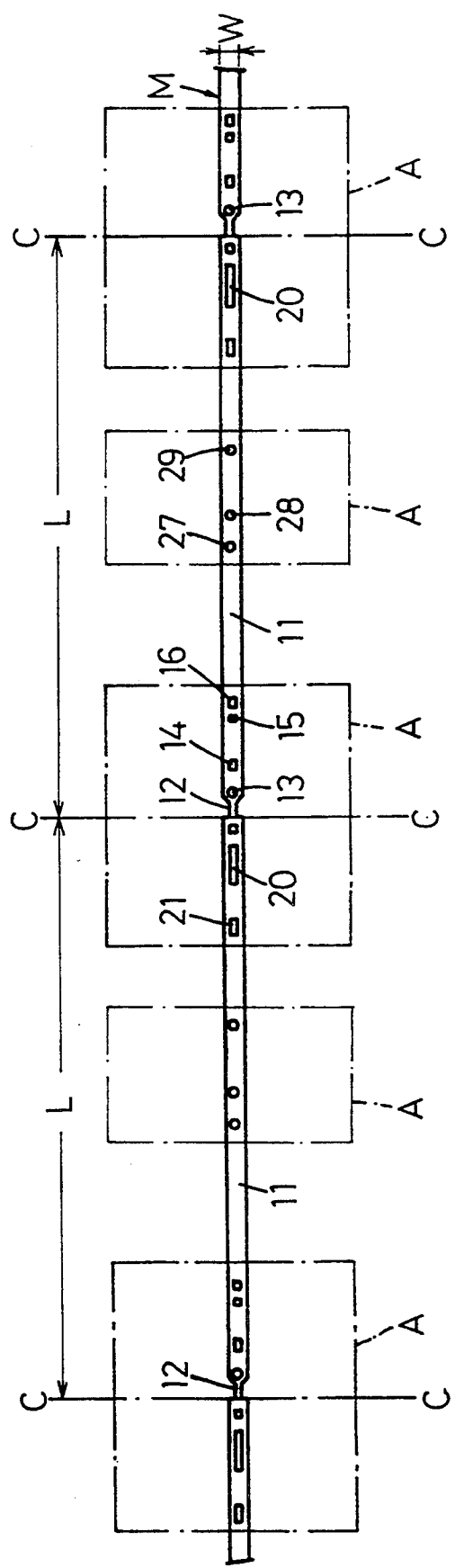
FIG. 10 is a plan view showing a metal strip material being punched to form clamping devices.
Figure 11:
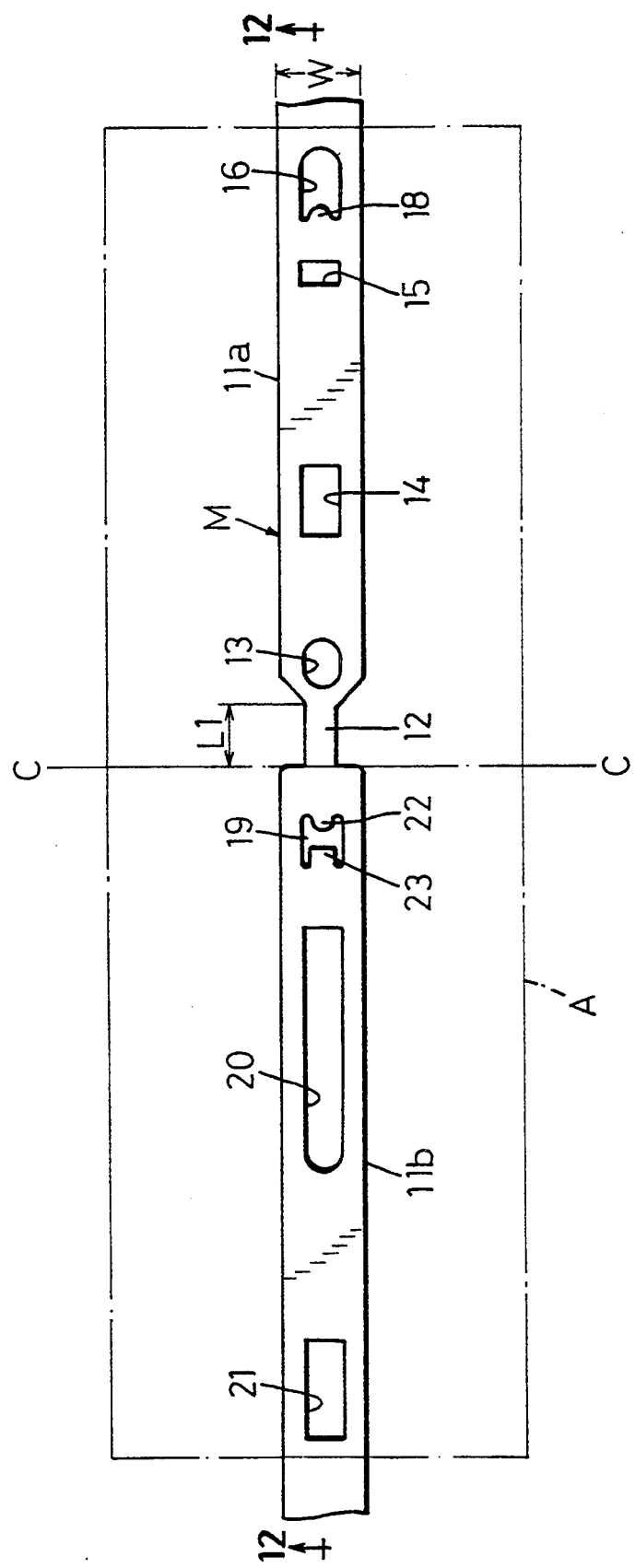
FIG. 11 is an enlarged plan view showing a portion of FIG. 10.
Figure 12:
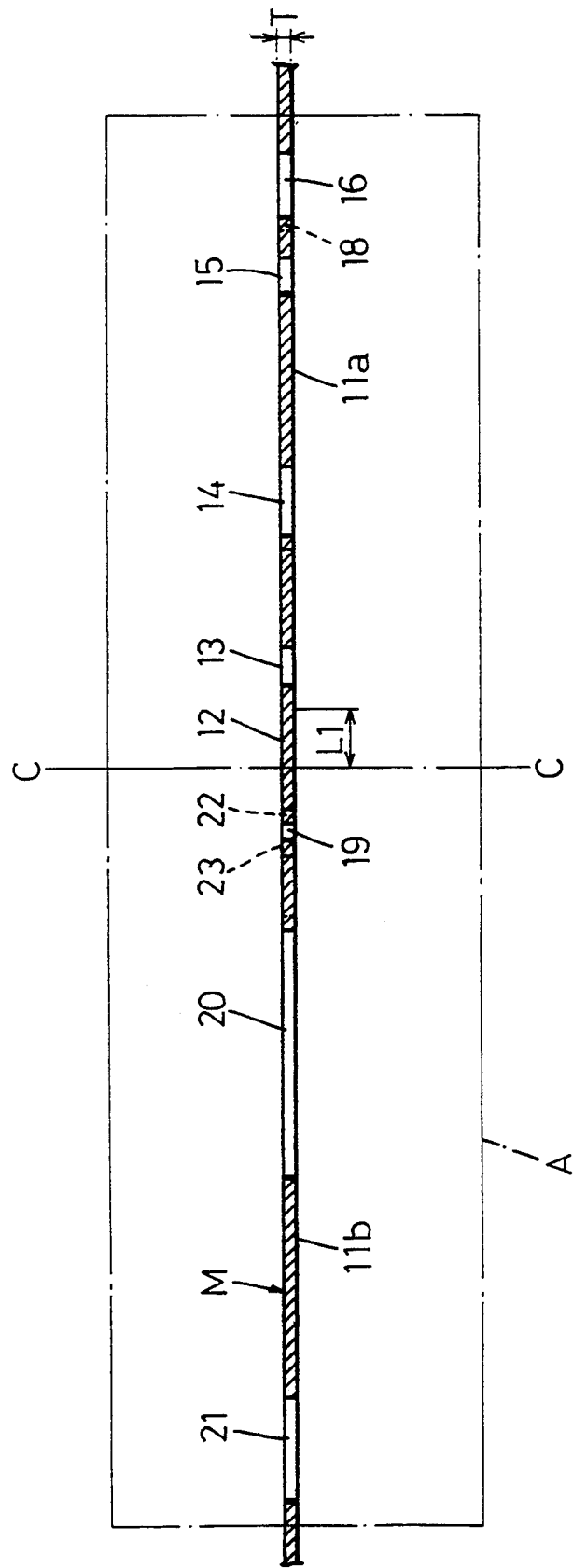
FIG. 12 is a sectional view taken along the line 12—12 in FIG. 11.

When the long-sized metal strip material M is automatically intermittently transferred in one direction along a transfer line, a notching operation to form the nose 12, the fixed tooth 22b, and the prop key 23 and a punching operation to form the forming locking pin receiving hole 13, the operating tool receiving hole 14, the prop key receiving hole 15, the fixed tooth receiving hole 16, the first through third formation relief holes 27, 28, 29, the nose receiving hole 21, the operating tool receiving communication hole 20, and the second convex channel wall receiving hole 19 are performed at a stroke. The manner of operation is as shown in FIGS. 10 through 12.

Figure 13:
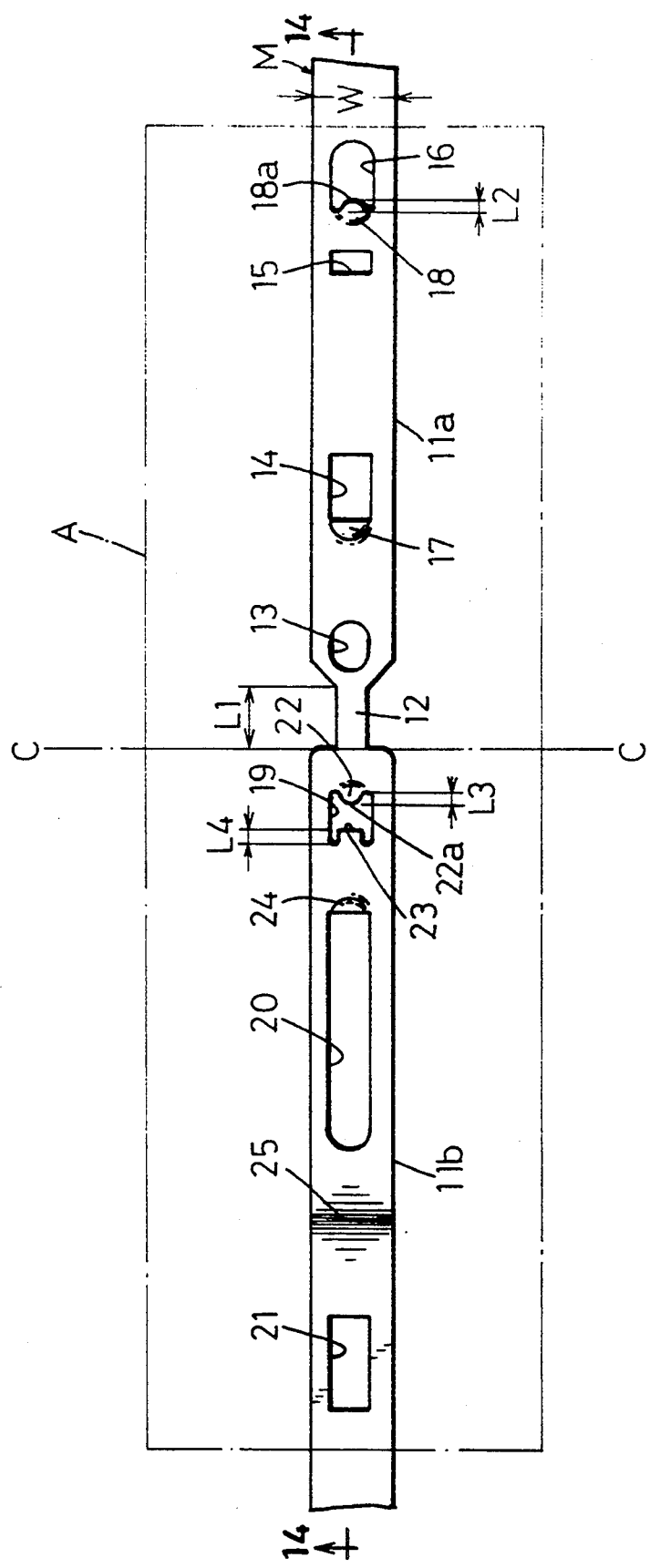
FIG. 13 is an enlarged plan view corresponding to FIG. 11, showing a bending-up operation.
Figure 14:
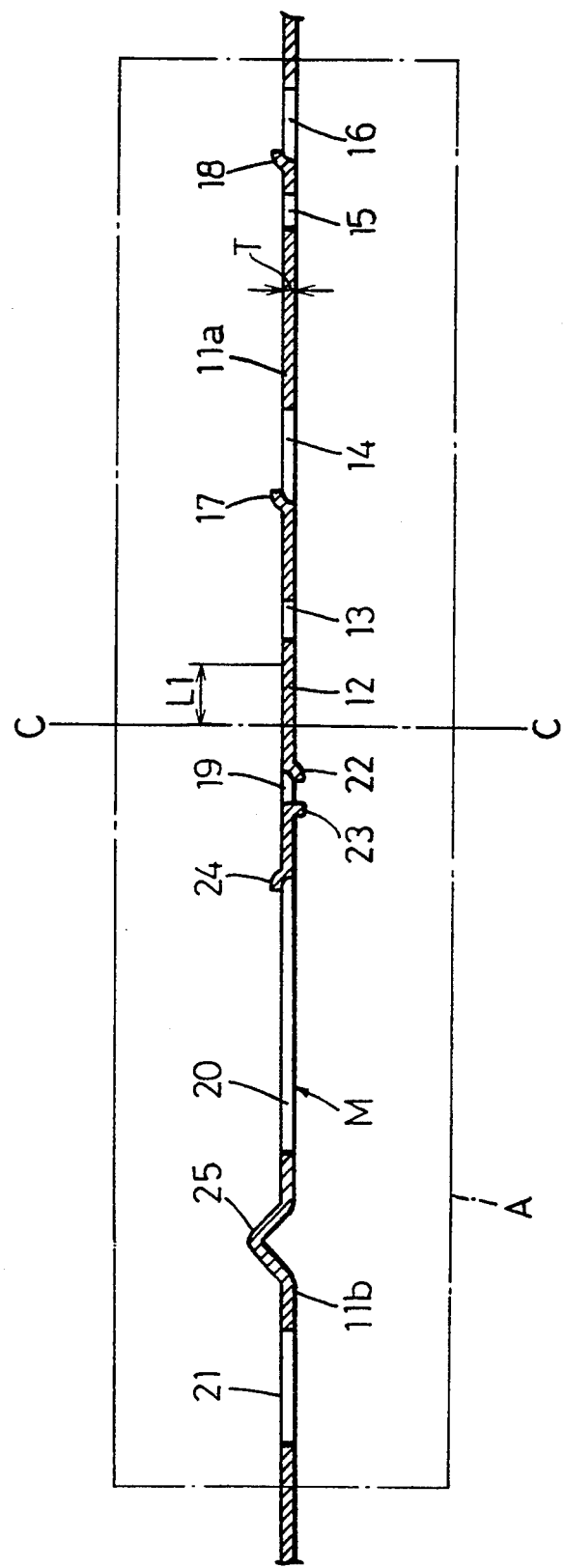
FIG. 14 is a sectional view taken along the line 14—14 in FIG. 13.
Figure 15:
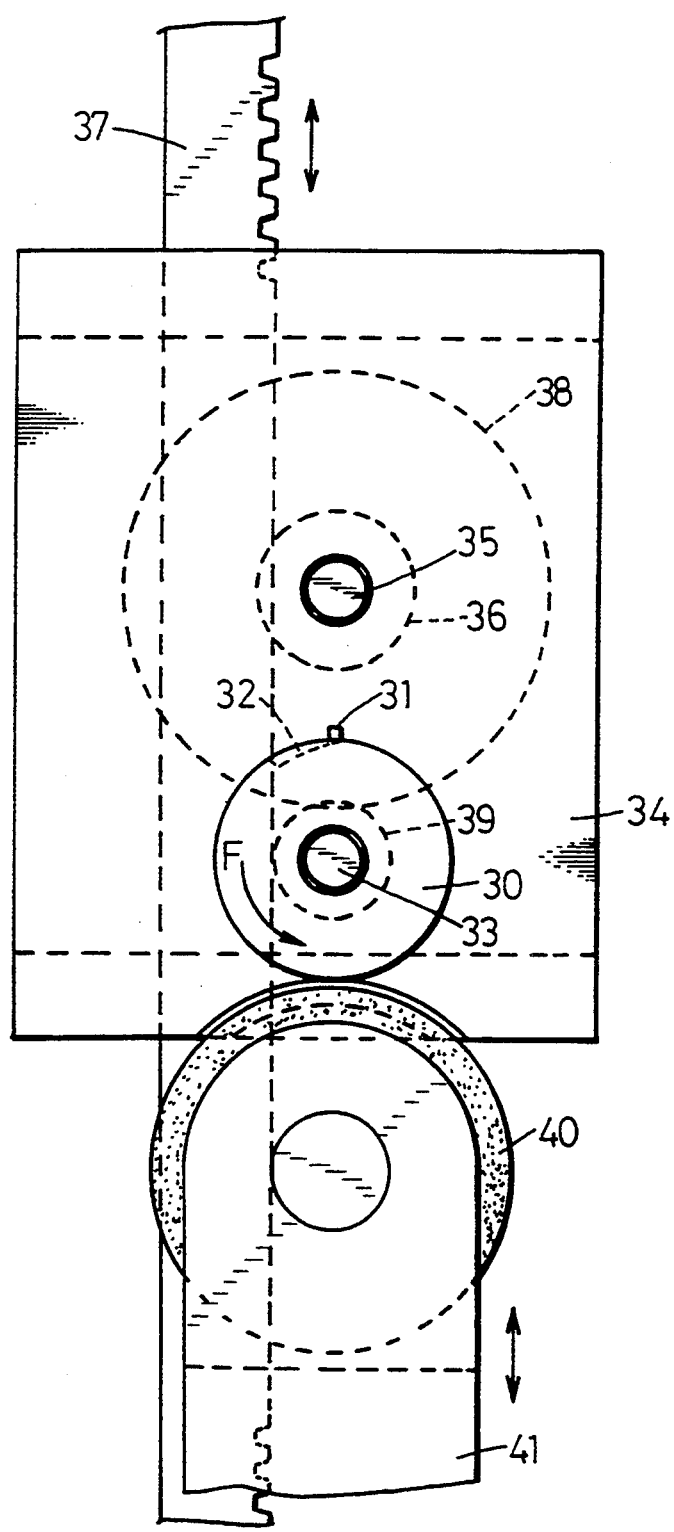
FIG. 15 is a front view showing a forming machine for roll-bending a clamping device.
Figure 16:
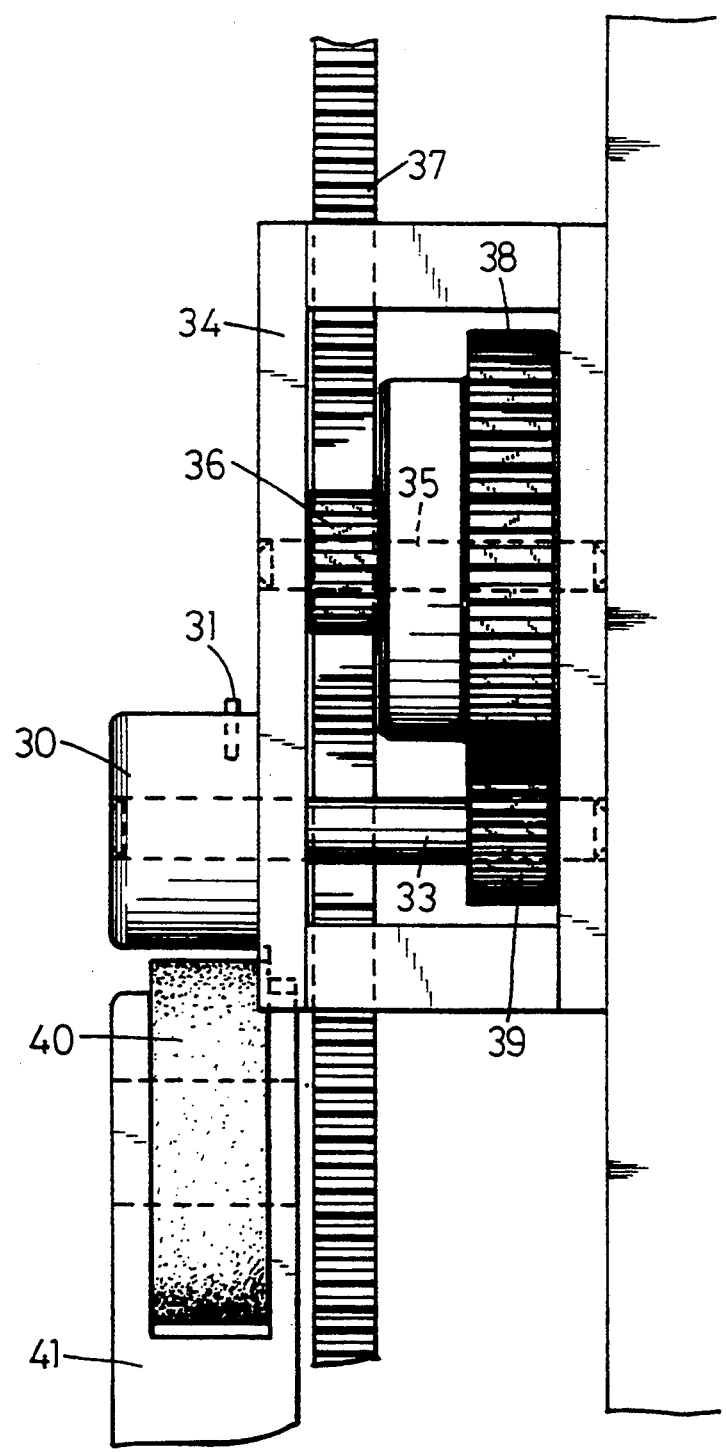
FIG. 16 is a side view of FIG. 15.
Figure 17:
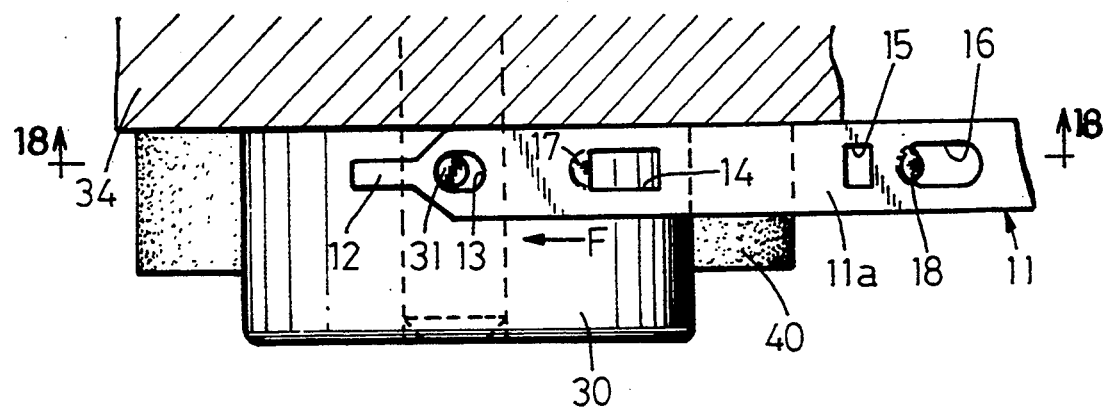
FIG. 17 is a plan view showing a clamping device attached to the mandrel roll of the forming machine.

The metal strip material M subjected to the punching operation is then passed through a bending-up die (not shown) for bending-up operation to form the first through third concave channel walls 17, 18, 24, the concave channel wall 22, and the prop key 23. The manner of operation is as shown in FIGS. 13 and 14. In that case, whereas the first through third channel walls 17, 18, 24 are outwardly bulged, the convex channel wall 22 and the prop key 23 are, of course, oppositely or inwardly bulged. In addition, the character A in FIGS. 10 through 14 suggests the necessary sizes of the punching die and bending-up die.

Thereafter, the metal strip material M is severed at positions C—C shown in FIGS. 10 through 14 into lengths L to provide clamp bands 11, and each clamp band is then formed with an outwardly bulged elastic hump 25 between the nose receiving hole 21 and the operating tool receiving communication hole 20 by a bending-up die (not shown).

Figure 4:
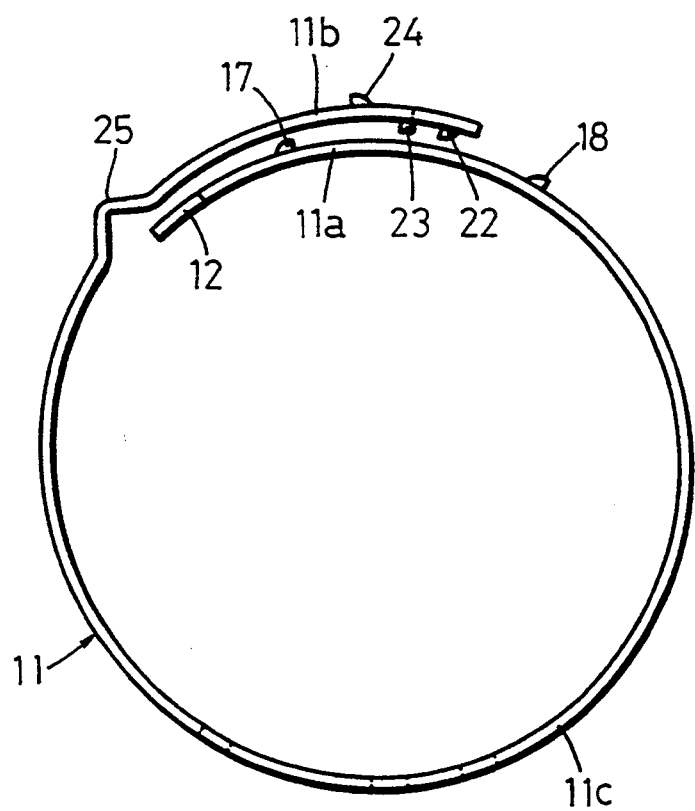
FIG. 4 is a front view of a product with a clamping device wound for three-dimensionalization.
Figure 5:
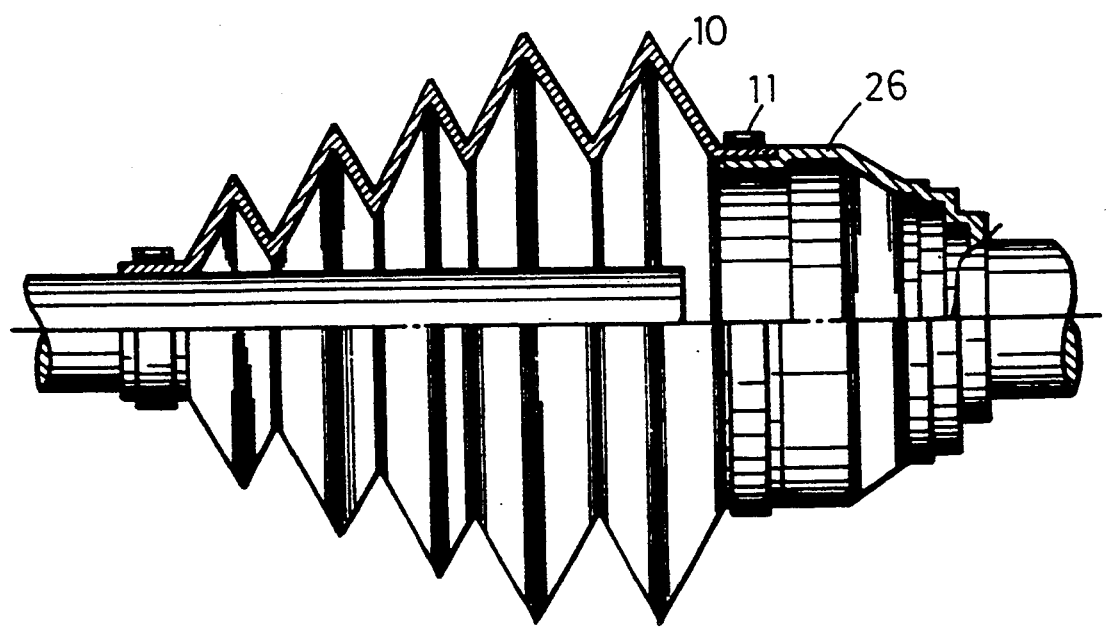
FIG. 5 is a view, half in section, showing the tightened used state of a part to be fixed by a clamping device.
Figure 6:
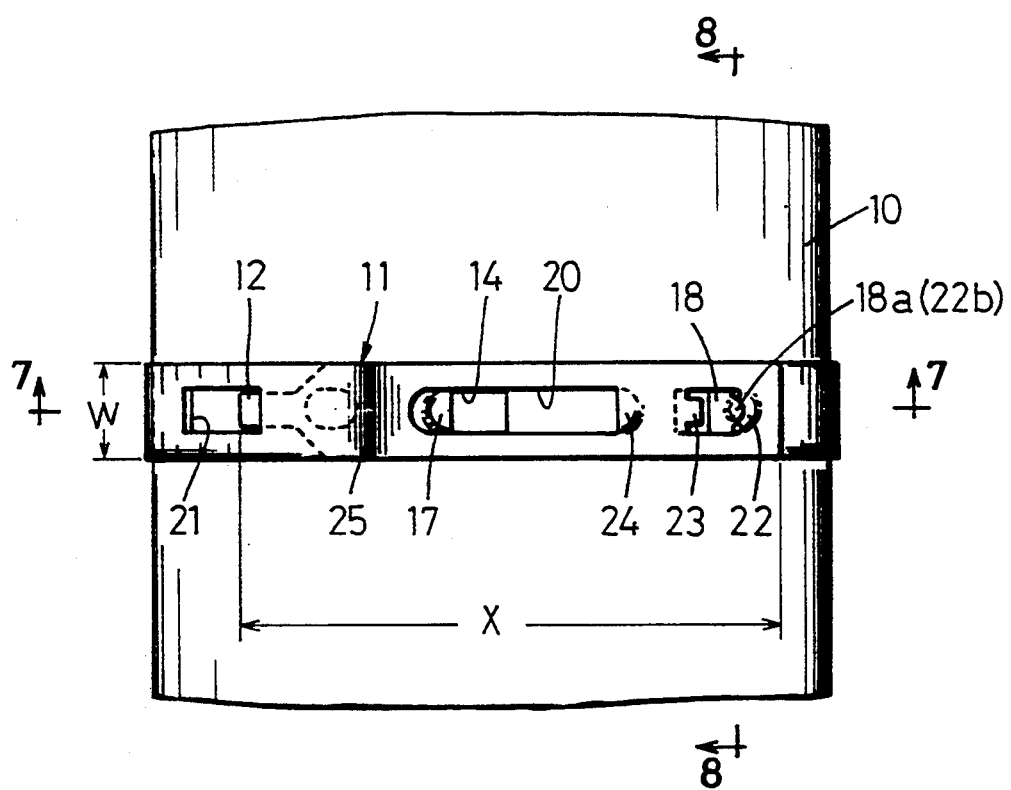
FIG. 6 is a partial enlarged plan view of FIG. 5.
Figure 7:
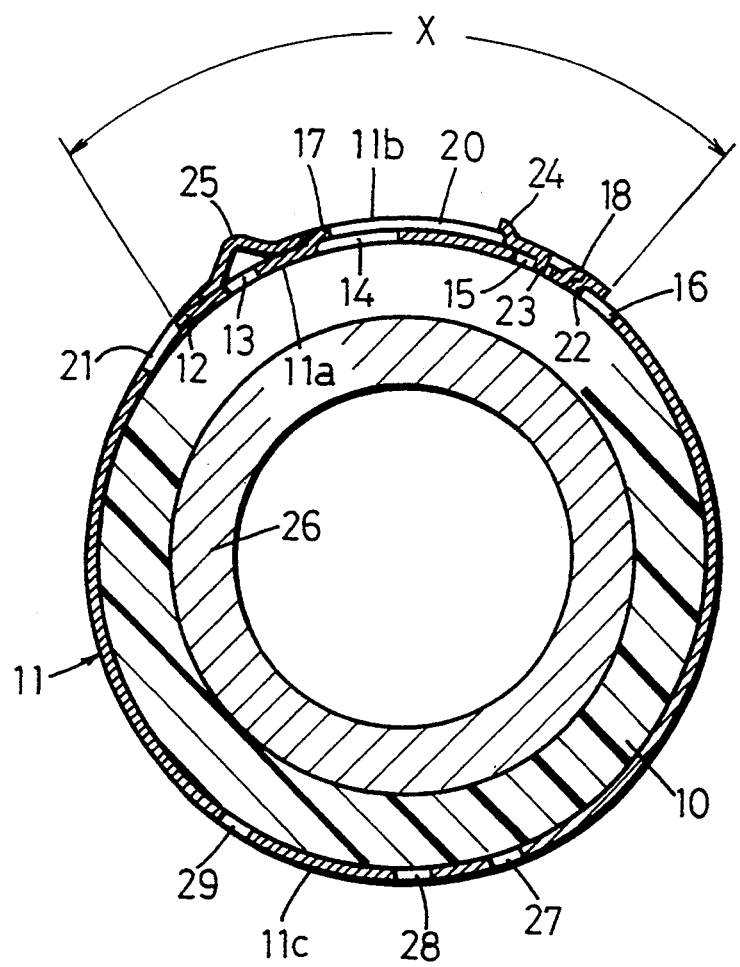
FIG. 7 is a sectional view taken along the line 7—7 in FIG. 6.
Figure 8:
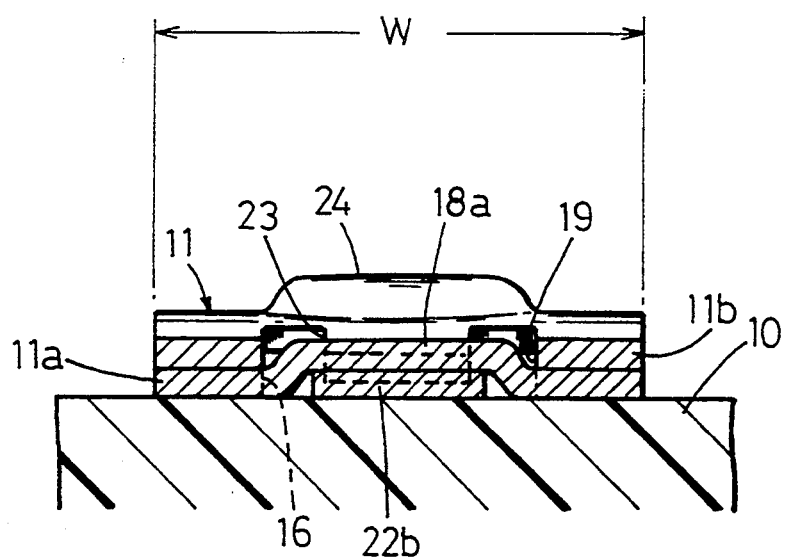
FIG. 8 is an enlarged sectional view taken along the line 8—8 in FIG. 6.

Each of the clamp bands 11 thus processed but still in planar form is fed from said transfer line to a forming machine, where it is roll-bent for three-dimensionalization in circular ring form in which the outer and inner overlap portions 11b and 11a overlap each other by a fixed amount X, thus providing a finished product as shown in FIG. 4. When the product is removed from the forming machine, the clamp band 11 will spring back; therefore, it has to be roll-bent to have a smaller bore diameter than that of the finished product by an amount corresponding to the amount of spring-back.

For this purpose, the roll-bending formation locking pin receiving hole 13 and the first through third relief holes 27, 28, 29 are used in the following manner.

FIGS. 15 through 19 show the roll-bending operation on the clamp band 11 using the forming machine. A locking pin 31 erected on the circumferential surface of a roll-bending forming mandrel roll 30 is inserted in the locking pin receiving hole 13 in the inner overlap portion 11a of the clamp band 11. The numeral 32 denotes a nose receiving groove cut in the circumferential surface of the mandrel roll for receiving therein the one cut end of the clamp band thus locked.

Figure 19:
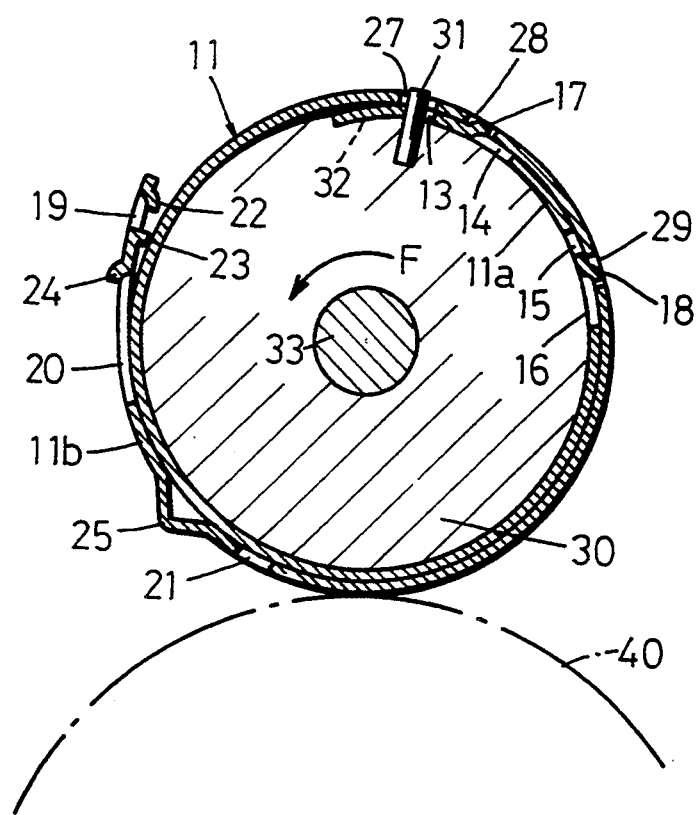
FIG. 19 is a sectional view corresponding to FIG. 18, showing the roll-bending operation of the clamping device.

The mandrel roll 30 is rotated to draw the clamp band 11 to wind it around the circumferential surface of the mandrel roll in two turns as shown in FIG. 19. In this case, in order to keep the clamp band in this smooth double wound state, the locking pin 31 of the mandrel roll 30 is inserted in the first relief hole 27 in the intermediate portion 11c, and the first and second convex channel walls 17 and 18 of the clamp band 11 are received in the second and third relief holes 28 and 29. That is, the first through third roll-bending formation relief holes 27, 28 and 29 are formed in the intermediate portion 11c of the clamp band 11 in such positional relation as to receive them in this correct manner.

The clamp band 11 wound around the mandrel roll 30 in this intimate double wound state is then removed from the mandrel roll 30, whereupon it springs back by the estimated amount; in this manner, the clamp band is finished as a clamping device as shown in FIG. 4.

The numeral 33 in FIGS. 15 through 19 denotes a mandrel roll shaft supported in a fixed frame 34, and 35 denotes a pinion gear shaft supported in the fixed frame 34 in parallel relation to the mandrel roll 33, said pinion gear shaft 35 carrying a pinion gear 36 thereon meshing with a rack gear 37 supported for reciprocating motion.

Figure 18:
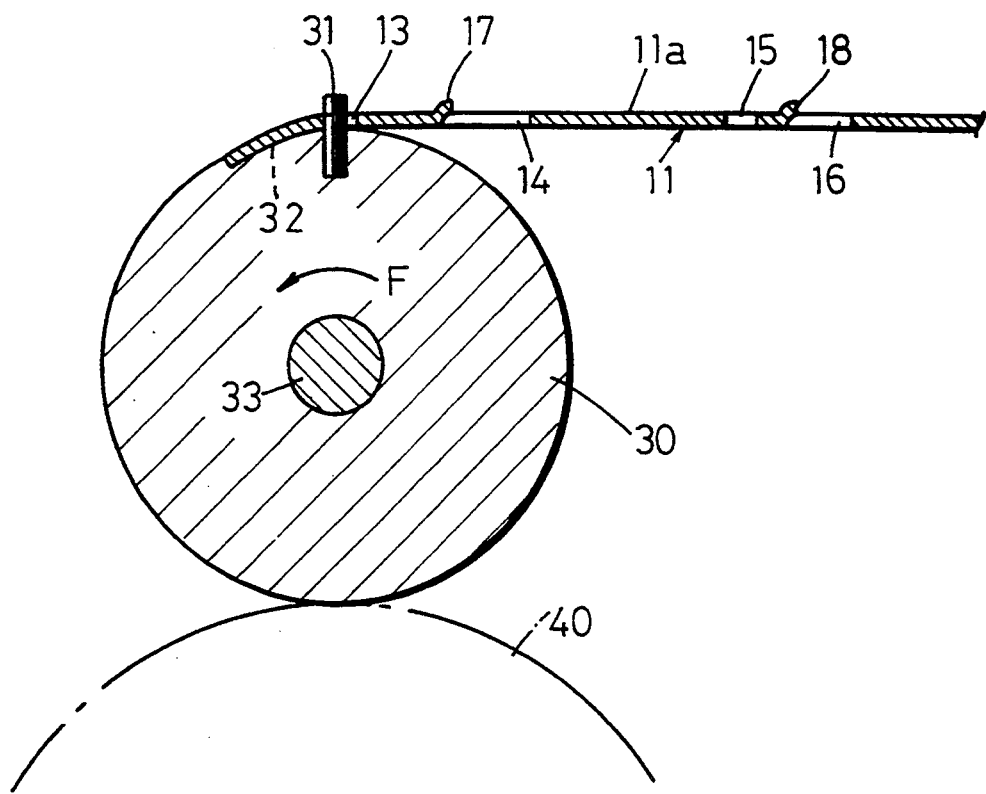
FIG. 18 is a sectional view taken along the line 18—18 in FIG. 17.

A large-diameter driving gear 38 supported on said pinion gear shaft 35 meshes with a small-diameter driven gear 39 supported on said mandrel roll shaft 33, so that when the rack gear 37 is moved, the mandrel roll 30 is rotated in the direction of arrow F in FIGS. 18 and 19.

The numeral 40 denotes a clamp band keep roll supported in a movable frame 41 movable under control toward and away from the mandrel roll 30, the circumferential surface of said keep roll being made of cushion material, such as urethane rubber, said keep roll being rotated together with the clamp band wound thereon.

More particularly, the clamp band 11 wound around the mandrel roll 30 is elastically pressed by the circumferential surface of the keep roll 40, so that even if the clamp band 11 has the first through third channel walls 17, 18, 19 and the elastic hump 25 bulged outwardly therefrom, the clamp band 11 can be roll-bent without any trouble. The clamp band 11 can be removed from the mandrel roll 30 by moving the keep roll 40 away from the mandrel roll 30.

Since the finished clamping device of the present invention as shown in FIG. 4 is the open type, when it is desired to fix a part 10, such as a fluid conveying hose, a dustproof bellows, axial boot or the like made of plastic material, such as synthetic material, on the connection circumferential surface of a desired mating device 26 by means of said clamping device, the clamp band 11 is once wrapped around the circumferential surface of the part 10 from the diametrical direction in such a manner that it will not slip off.

Figure 20:
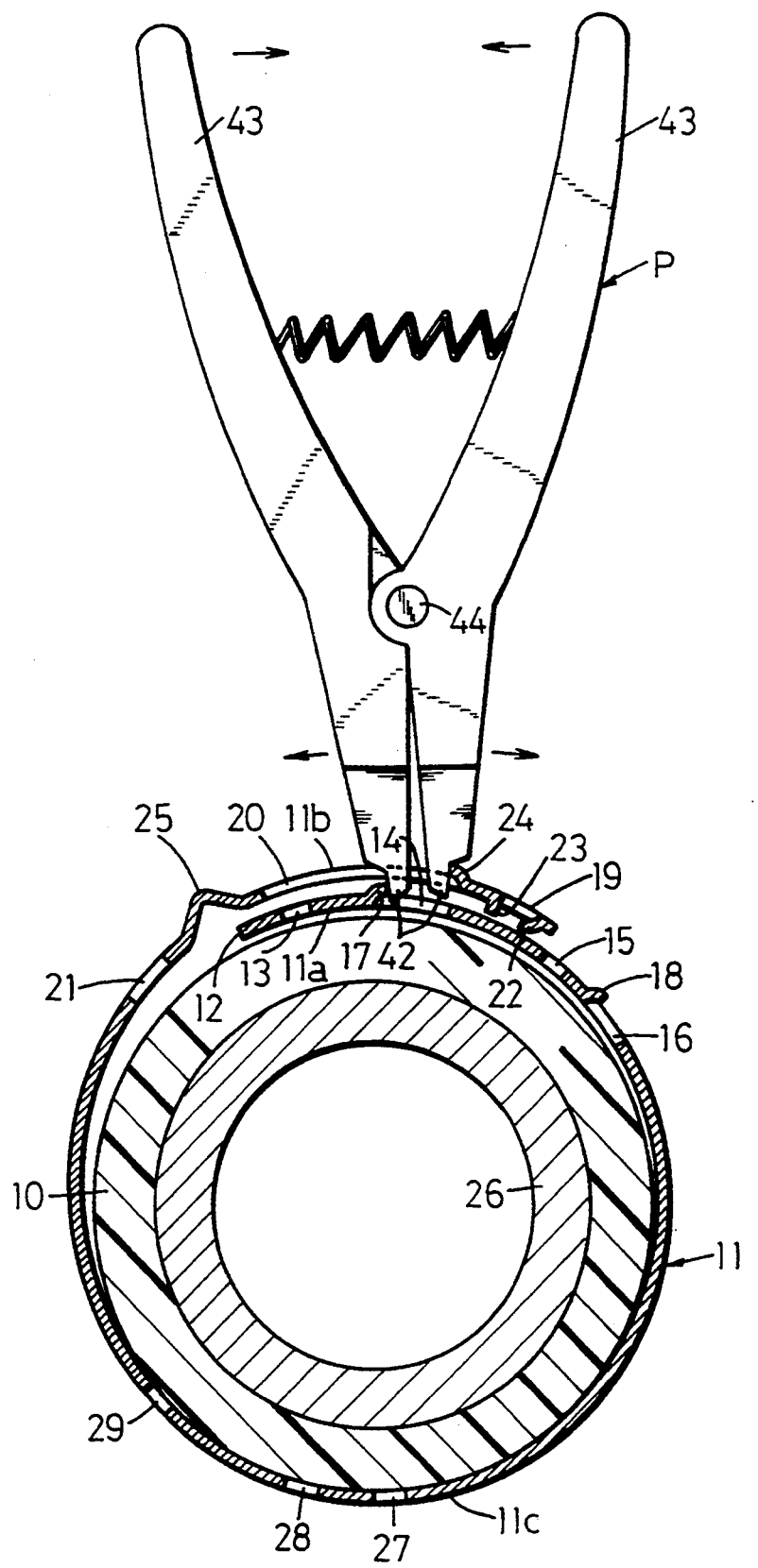
FIG. 20 is a front view showing the clamping device wrapped around a part to be fixed and also showing a spread type operating tool applied thereto.

In this wrapped state, since the inner and outer overlap portions 11a and 11b of the clamp band 11 temporarily overlap each other, the pair of active teeth 42 provided at the front end of the spread type operating tool P can be engaged with the third convex channel wall 24 of the operating tool receiving communication hole 20 in the outer overlap portion 11b and the first convex channel wall 17 of the operating tool receiving hole 14 in the inner overlap portion, as suggested from FIG. 20.

The operating tool receiving communication hole 20 in the outer overlap portion is more elongated than the operating tool receiving communication hole 14 in the inner overlap portion 11a, the active teeth 42 of the operating tool P can be inserted in the operating tool receiving hole 14 in the inner overlap portion 11a through the operating tool receiving communication hole 20 in the outer overlap portion 11b.

Figure 21:
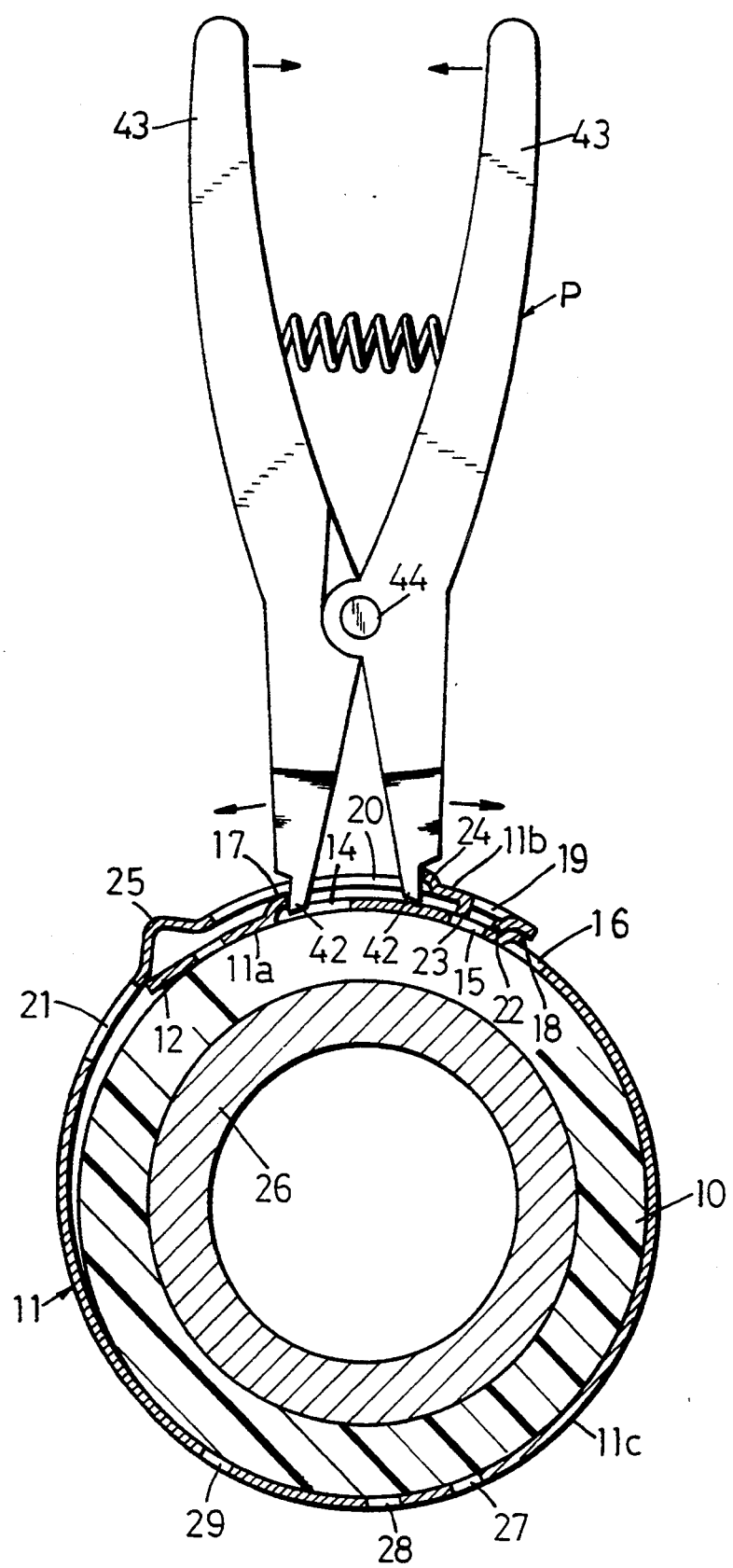
FIG. 21 is a front view corresponding to FIG. 20, showing the clamping device being spread.
Figure 22:
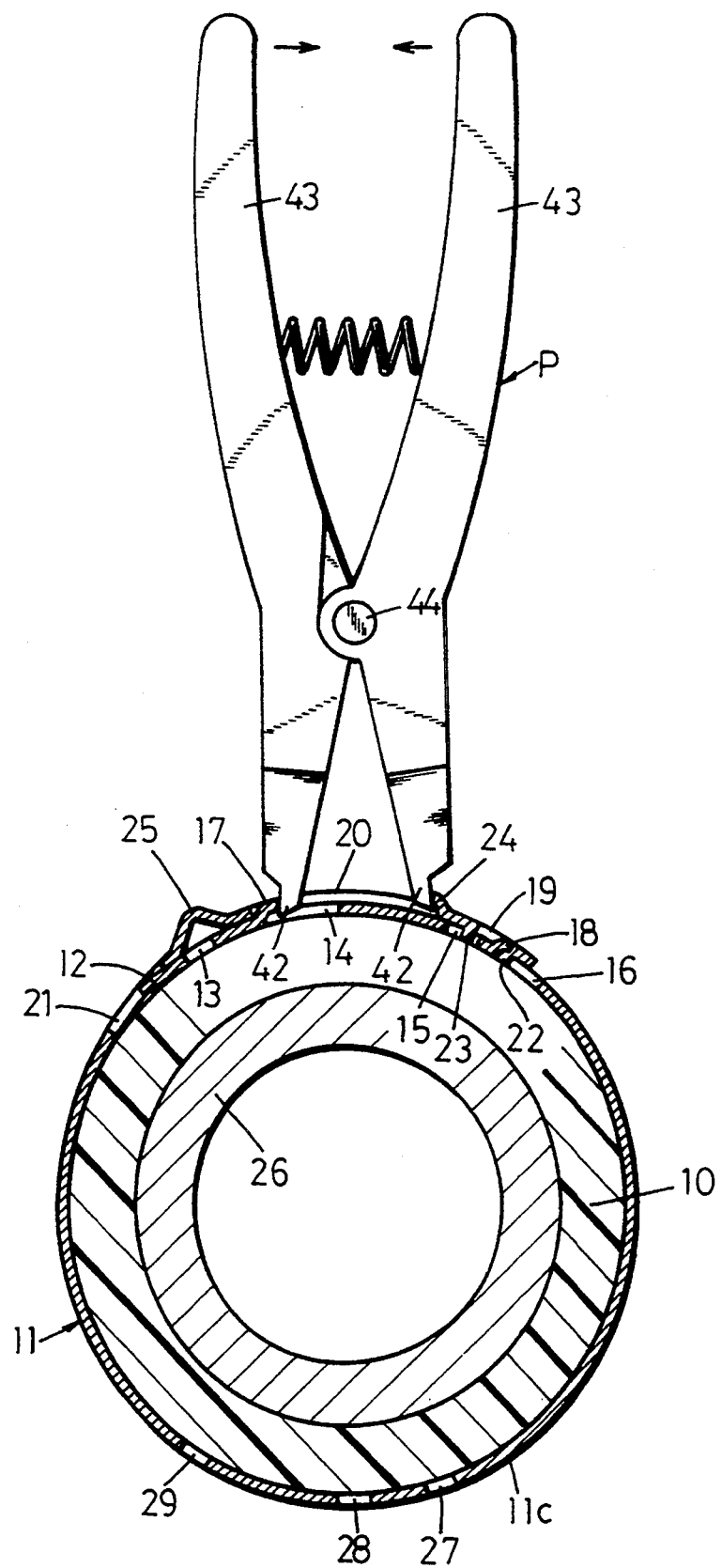
FIG. 22 is a front view showing the tightened state of the clamping device upon completion of the spread operation.

The operator grips the pair of handles 43 of the operating tool P to spread the pair of active teeth 42 around an assembling pivot 44, whereby the bore diameter of the clamp band 11 is forcibly contracted, during which operation, as suggested from FIGS. 21 and 22, the nose 12 forming one cut end of the inner overlap portion is received in the nose receiving hole 21, while the concave channel wall 22 positioned on the other cut end of the outer overlap portion 11b and the second convex channel wall 18 of the inner overlap portion 11a move across each other and the prop key 23 of the outer overlap portion 11b is received in the prop key receiving hole 15 in the inner overlap portion 11a through the second convex channel receiving hole 19. Finally, the fixed tooth 22b and the seizing tooth 18 firmly seize each other, with the result that the part 10 is integrally tightly fixed on the connecting circumferential surface of a desired mating device 26, as shown in FIGS. 5 through 9. Thereafter, the active teeth 42 of the operating tool P are extracted, of course.

In that case, the second convex channel wall 18 of the inner overlap portion 11a is outwardly bulged by approximately the same amount as the thickness T of the metal strip material M, while the concave channel wall 22 of the outer overlap portion 11b oppositely or inwardly bulged by approximately the same amount as the thickness T of the metal strip material M; therefore, the seizing tooth 18a and the fixed tooth 22b seize each other in the overlap plane of the inner and outer overlap portions 11a and 11b, so that there is no danger of them moving in the disengaging direction and the clamping device is superior in service durability to withstand torques, vibrations and shocks. This arrangement also serves for flattening of the clamp band 11.

Even if the part to be fixed 10 is made of highly rigid synthetic resin having no elasticity, the clamp band 11 for clamping it on the circumferential surface has the spring force acting circumferentially of the clamp band 11 in the elastic hump 25; therefore, the elastic hump 25 elastically deforms to exert the tension spring force to ensure that it incessantly intimately contacts the circumferential surface of the part 10 without any clearance therebetween, thus maintaining this clamp state semipermanently. This also applies to the case where a part 10 made of rubber material having elasticity looses its elasticity owing to aging.

As soon as an accidental disengaging force is exerted between the fixed tooth 22b and the seizing tooth 18a in the state in which the part 10 is clamped on the desired mating device 26, the prop key 23 of the outer overlap portion 11b engages the opening edge of the prop key receiving hole 15 in the outer overlap portion 11b and acts to prop the second convex channel wall 18 from behind; therefore, the clamped state will not be loosened, much less the clamp band 11 is disassembled, it being maintained in the perfect locked state. Torques, vibrations, shocks and the like which are produced during use are effectively absorbed by the elastic hump 25; therefore, the clamp band 11 intimately contacts the circumferential surface of the part 10 without forming level differences or clearances and its clamping force uniformly acts on the entire circumferential surface of the part 10, eliminating the danger of producing local weakness.

Further, the pair of active teeth 42 are locked both by the first convex channel wall 17 forming the opening edge of the operating tool receiving hole 14 in the inner overlap portion 11a and by the third convex channel wall 24 forming the opening edge of the operating tool receiving communication hole 20 of the outer overlap portion 11b. Since the first and third convex channel walls 17 and 24 are both outwardly bulged, they can stably support the spreading force produced by the active teeth 42, being superior in resistance to force.

As has so far been described, the present invention provides a clamping device including a clamp band 11 of metal strip material M cut to a fixed length L, said clamp band 11 being wound in a circular ring for three-dimensionalization such that an inner overlap portion 11a terminating in one roll-bent end and an outer overlap portion 11b terminating in the other end overlap each other by a fixed amount X, the bore diameter of said clamp band 11 being artificially forcibly contracted, thereby fixing a part to be fixed 10, such as a fluid conveying hose, dustproof bellows, axial boot or the like made of plastic material, such as rubber or synthetic resin, on the connecting circumferential surface of a desired mating device 26, said clamping device being characterized in that:

one cut end of the inner overlap portion 11a alone is notched to form a nose 12 of fixed width W1 smaller than the fixed width W of the metal strip material M, the inner overlap portion 11a is formed with an operating tool receiving hole 14, a prop key receiving hole 15 and a fixed tooth receiving hole 15, distributed in the order mentioned from the nose 12 toward an intermediate portion 11c where the clamp band 11 does not overlap, the opening edge of said operating tool receiving hole 14 on the side adjacent the nose 12 is outwardly bulged to form a first convex channel wall 17 for operating tool reception, the opening edge of said fixed tooth receiving hole 16 on the side adjacent the prop key receiving hole 15 is outwardly bulged to form a second convex channel wall 18, and a portion of the middle of said second convex channel wall 18 forms a seizing tooth 18a bulged toward said fixed tooth receiving hole 16, the outer overlap portion 11b is formed with a hole 19 for receiving the second convex channel wall 18, an operating tool receiving communication hole 20 which communicates with said operating tool receiving hole 14, and a hole 21 for receiving said nose 12, distributed in the order mentioned from the other cut end toward the intermediate region 11c where the clamp band does not overlap, the opening edge of said second convex channel wall receiving hole 19 adjacent the other cut end is oppositely or inwardly bulged to form a concave channel wall 22 opposed to said second convex channel wall 18, a portion of the middle of said concave channel wall 22 being bulged inwardly toward said second convex channel wall receiving hole 19 to form a fixed tooth 22b adapted to be seized by said seizing tooth 18a, the opening edge of the second convex channel wall receiving hole 19 on the side adjacent said operating tool receiving communication hole 20 is bent to form a prop key 23 adapted to be received in the prop key receiving hole 15 through the second convex channel wall receiving hole 19, the opening edge of the operating tool receiving communication hole 20 on the side adjacent the second convex channel wall receiving hole 19 is outwardly bulged to form a third convex channel wall 24 opposed to said first convex channel wall 17 for supporting the operating tool, the clamp band is formed with an elastic hump outwardly bulged between said operating tool receiving communication hole 20 and said nose receiving hole 21 for storing the spring force acting circumferentially of the clamp band, the arrangement being such that the active teeth 42 of a spread type operating tool P are respectively engaged with the first convex channel wall 17 of the operating tool receiving hole 14 in said inner overlap portion 11a and the third convex channel wall 24 of the operating tool receiving communication hole 20 in said outer overlap portion 11b and the operating tool is manipulated to spread its pair of active teeth 42 to forcibly deform the bore diameter of said clamp band 11, whereupon the seizing tooth 18a of the inner overlap portion 11a and the fixed tooth 22b of the outer overlap portion 11b seize each other, and as soon as a force acts to cause disengagement between the fixed tooth 22b and the seizing tooth 18a, the prop key 23 of the outer overlap portion 11b engages the opening edge of the prop key receiving hole 15 in the inner overlap portion. As a result of this arrangement, the present invention rationally achieves various objects described at the outset.

That is, according to the arrangement of the present invention, the clamp band 11 is made of metal strip material M, such as stainless steel or the like, and has the elastic hump 25 outwardly bulged therefrom to store the spring force acting circumferentially of the clamp band 11. Therefore, even if the part to be fixed 10 is a dustproof bellows, axial boot or the like made of highly rigid synthetic resin with no elasticity or even if the part 10 is a fluid conveying hose made of elastic rubber material looses its elasticity owing to aging, the clamping device fixedly maintains such part in permanent, reliable close contact with the connecting circumferential surface of any desirable mating device 26 and maintains it in a stable firm clamped state.

Further, unlike the lobe in the conventional lobed clamping device, the elastic hump is not subjected to squeezing or crushing by a pair of pliers and acts in its free state as a tension spring element. Thus, weight distribution in the circumferential direction of the clamp band is not deviated, allowing the clamping force to act uniformly on the circumferential surface of the part 10, absorbing torques, vibrations and shocks produced during use.

Further, said hump 25 is positioned in the region where the outer and inner overlap portions 11b and 11a overlap each other by a fixed amount X and it is outwardly bulged from said outer overlap portion 11b and the lower surface its opening is closed by the inner overlap portion 11a.

Thus, the narrow nose 12 branching from one cut end of the inner overlap portion 11b is received in the nose receiving 21; therefore, the claming active surface of the clamp band 11 can be intimately contacted with the circumferential surface of the part 10, and in this respect there is no danger of producing local weakness in the clamping force.

Further, a portion of the middle of the second convex channel wall 18 outwardly bulged from the inner overlap portion 11a forms the seizing tooth 18a, while a portion of the middle of the concave channel wall 22 oppositely or inwardly bulged from the outer overlap portion 11b forms the fixed tooth 22b, and said seizing teeth 18a and fixed tooth 22b seize or lock each other in the overlap plane of the outer and inner overlap portions 11b and 11a. Therefore, the clamp band 11 can be flattened to a great extent and the warping-up in the direction to cause disengagement between the seizing tooth 18a and the fixed tooth 22b is effectively prevented. Such effects can be further promoted by employing the arrangement described in claim 2, said arrangement having high service durability to withstand high speed rotation, violent vibrations and shocks.

Further, the prop key 23 extending from the outer overlap portion 11b of the clamp band 11 is received in the prop key receiving hole 15 in the inner overlap portion 11a through the second convex channel wall receiving hole 19 in the outer overlap portion 11b, so that as soon as an accidental disengaging force acts between the fixed tooth 22b and the seizing tooth 18a, the prop key engages the opening edge of the receiving hole 15; thus, the tightened state of the part 10 established by the cooperation between the fixed tooth 22b and the seizing tooth 18a will not be loosened during use, much less the clamping device is disassembled, said state being maintained stably and firmly.

The clamp band 11 is adapted to have its bore diameter reduced by the spread type operating tool P. The pair of active tooth 42 of said operating tool P are adapted to be locked by the third convex channel wall 24 of the operating tool receiving communication hole 20 in the outer overlap portion 11b of the clamp band 11 and by the first convex channel wall 17, opposed thereto, of the operating tool receiving hole 14 in the inner overlap portion 11a. Since both of the first and third channel walls 17 and 24 are outwardly bulged, the active teeth 42 can be stably supported and are resistant to the spreading force.

Further, if the arrangement described in claim 3 is employed, the clamp band 11 can be easily wrapped around the circumferential surface of the roll-bending formation mandrel roll 30 twice in intimately contacted relation by taking its tendency to spring back into account. In this manner, clamping devices having an intended bore diameter can be mass-produced with high precision and stability.

What is claimed is:

1. A clamping device including a clamp band (11) of metal strip material (M) cut to a fixed length (L), said clamp band (11) being wound in a circular ring for three-dimensionalization such that an inner overlap portion (11a) terminating in one roll-bent end and an outer overlap portion (11b) terminating in the other end overlap each other by a fixed amount (X), the bore diameter of said clamp band (11) being artificially forcibly contracted, thereby fixing a part to be fixed (10), such as a fluid conveying hose, dustproof bellows, axial boot or the like made of plastic material, such as rubber or synthetic resin, on the connecting circumferential surface of a desired mating device (26), said clamping device being characterized in that:

one cut end of the inner overlap portion (11a) alone is notched to form a nose (121) of fixed width (W1) smaller than the fixed width (W) of the metal strip material (M), the inner overlap portion (11a) is formed with an operating tool receiving hole (14), a prop key receiving hole (15) and a fixed tooth receiving hole (16), distributed in the order mentioned from the nose (12) toward an intermediate portion (11c) where the clamp band (11) does not overlap, the opening edge of said operating tool receiving hole (14) on the side adjacent the nose (12) is outwardly bulged to form a first convex channel wall (17) for operating tool reception, the opening edge of said fixed tooth receiving hole (16) on the side adjacent the prop key receiving hole (15) is outwardly bulged to form a second convex channel wall (18), and a portion of the middle of said second convex channel wall (18) forms a seizing tooth (18a) bulged toward said fixed tooth receiving hole (16), the outer overlap portion (11b) is formed with a hole (19) for receiving the second convex channel wall (18), an operating tool receiving communication hole (20) which communicates with said operating tool receiving hole (14), and a hole (21) for receiving said nose (12), distributed in the order mentioned from the other cut end toward the intermediate portion (11c) where the clamp band (11) does overlap, the opening edge of said second convex channel wall receiving hole (19) adjacent the other cut end is oppositely or inwardly bulged to form a concave channel wall (22) opposed to said second convex channel wall (18), a portion of the middle of said concave channel wall (22) being bulged inwardly toward said second convex channel wall receiving hole (19) to form a fixed tooth (22b) adapted to be seized by said seizing tooth (18a), the opening edge of the second convex channel wall receiving hole (19) on the side adjacent said operating tool receiving communication hole (20) is bent to form a prop key (23) adapted to be received in the prop key receiving hole (15) through the second convex channel wall receiving hole (19), the opening edge of the operating tool receiving communication hole (20) on the side adjacent the second convex channel wall receiving hole (19) is outwardly bulged to form a third convex channel wall (24) opposed to said first convex channel wall (17) for supporting the operating tool, the clamp band (11) is formed with an elastic hump (25) outwardly bulged between said operating tool receiving communication hole (20) and said nose receiving hole (21) for storing the spring force acting circumferentially of the clamp band (11), the arrangement being such that the active teeth (42) of a spread type operating tool (P) are respectively engaged with the first convex channel wall (17) of the operating tool receiving hole (14) in said inner overlap portion (11a) and the third convex channel wall (24) of the operating tool receiving communication hole (20) in said outer overlap portion (11b) and the operating tool (P) is manipulated to spread its pair of active teeth (42) to forcibly deform the bore diameter of said clamp band (11), whereupon the sizing tooth (18a) of the inner overlap portion (11a) and the fixed tooth (22b) of the outer overlap portion (11b) seize each other, and as soon as a force acts to cause disengagement between the fixed tooth (22b) and the seizing tooth (18a), the prop key (23) of the outer overlap portion (11b) engages the opening edge of the prop key receiving hole (15) in the inner overlap portion (11a).

2. A clamping device as set forth in claim 1, characterized in that the first through third convex channel walls (17, 18, 24) are outwardly bulged each by an amount approximately equal to the thickness (T) of the metal strip material (M), and the concave channel wall (22) is inwardly bulged by an amount approximately equal to the thickness (T) of the metal strop material (M).

3. A clamping device as set forth claim 1, characterized in that;

the clamp band (11) is formed with a roll-bending formation locking pin receiving hole (13) between the nose (12) and the operating tool receiving hole (14) of the inner overlap portion (11a) of the clamp band (11), the clamp band (11) is formed with first through third relief holes (27, 28, 29) for roll-bending formation in the intermediate portion (11c) where the clamp band (11) does not overlap, the arrangement is such that when the clamp band (11) is roll-bent to draw it with a locking pin (31) erected from the circumferential surface of the roll-bending formation mandrel roll (30) of small diameter received in said locking pin receiving hole (13), the locking pin (31) of the mandrel roll (30) is received in the first relief hole (27) and the first and second convex channel walls (17, 28) of the clamp band (11) received in the second and third relief holes (28, 29), whereby the clamp band (11) is wrapped around the circumferential surface of said mandrel roll (30) twice in the intimately contacted state.

* * * * *